June 21, 1927.
O. U. ZERK
1,632,987
LUBRICATING APPARATUS
Original Filed Nov. 21, 1922
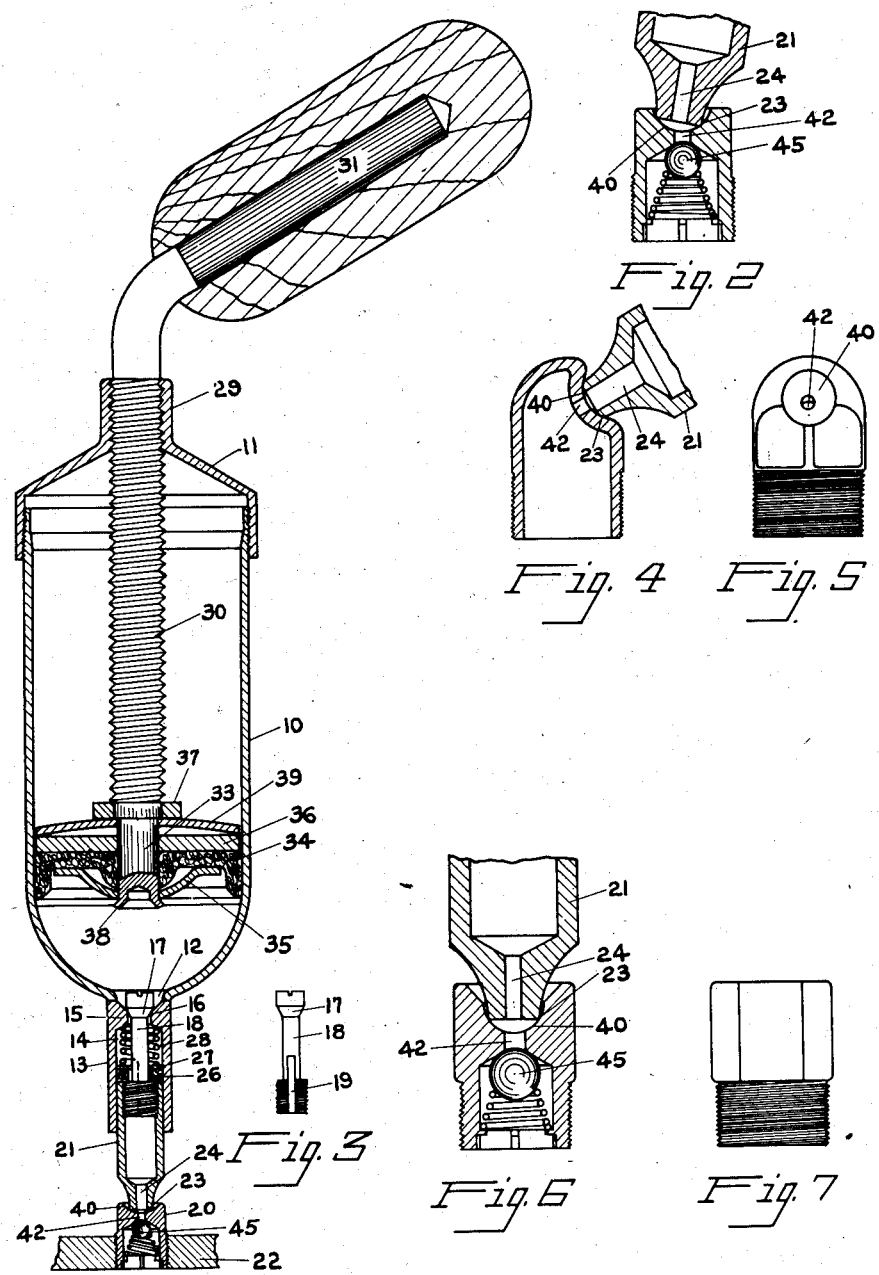
INVENTOR.
Oscar Ulysses Zerk
BY
Richey, Slough & Watts.
ATTORNEYS Patented June 21, 1927.

1,632,987

UNITED STATES PATENT OFFICE.

OSCAR ULYSSES ZERK, OF CLEVELAND, OHIO, ASSIGNOR, BY MESNE ASSIGNMENTS, TO THE BASSICK MANUFACTURING COMPANY.

LUBRICATING APPARATUS.

Original application filed November 21, 1922, Serial No. 602,465. Divided and this application filed January 3, 1924. Serial No. 684,170.

My invention relates to improvements in lubricating apparatus.

In the lubrication of moving elements, and especially in automobiles, it has become uniform practice to provide the elements with inlet nipples, to which a grease or oil gun is detachably secured. Generally, the gun is provided with a flexible outlet tube having at its end a coupling which is adjusted manually and locked against the inlet nipple to provide a tight joint therebetween. After the user has locked the coupling by hand, he then grasps the gun barrel with one hand and with the other hand screws the plunger down, forcing the grease through the conduit.

These several operations each require considerable time, are often performed from awkward positions, and further, in handling the coupling, from which grease leaks during the pressure operation and especially after being removed, the user's hands become greasy and dirty causing the gun and the coupling to slip when handled, and necessitating additional time in which to perform the attaching and detaching operations.

The main object of my invention resides in overcoming these objections by so constructing a pistol and a nipple, that the pistol can be held in one hand and placed in direct osculatory, leakproof contact with the nipple, and while so held will inject lubricant into the nipple, when direct pressure is applied thereto.

Another object of my invention resides in providing a pistol with a metal connector which is so shaped that it forms a leakproof direct metal to metal contact with a nipple.

Another object of my invention is to construct the contacting faces of a nipple and a connector, so that one provides a circular edge which fits against a concave spherical surface of the other, to provide a leakproof pressure maintained contact therebetween, in which, when pressed together in varying angular relations, the circular edge encloses a passage in the convex spherical surface.

Another object of my invention is to provide an improved lubricating system comprising a gun with a lubricant reservoir and a nozzle, the said nozzle having a contact face with a centrally disposed exit opening together with a lubricant receiving nipple having a face provided with an inlet opening positioned, preferably, centrally thereof, the one face having a peripheral circular edge and the other face having a concave spherically shaped surface, and means adapted to eject lubricant under pressure from the exit opening, the nozzle contact face being adapted to be pressed against that of the nipple by the operator pressing the gun toward the nipple from any one of a number of different angular directions, the manual pressure so exerted being adapted to cause the ejection of lubricant from the nozzle into the nipple and at the same time to provide sufficient pressure to maintain a tight lubricant proof contact between the circular edge of the one contact face and the spherical surface of the other contact face which engages it.

The invention further resides and consists in the arrangement and combinations of parts hereinafter described and claimed, reference being had to the accompanying drawings wherein—

Fig. 1 is a medial vertical longitudinal sectional view of an embodiment of my invention.

Fig. 2 is a similar view of the nozzle end in contact with the nipple and at an angle to the axis of the nipple.

Fig. 3 is a side elevational view of the valve between the nozzle and the lubricant reservoir.

Fig. 4 is a medial vertical sectional view of a modified form of nipple and a fragmentary portion of a nozzle in contact therewith.

Fig. 5 is a side elevational view of the modified form of nipple in Fig. 4.

Fig. 6 is a medial vertical sectional view of another modified form of nipple and a fragmentary end of a nozzle.

Fig. 7 is a side elevational view of the modified nipple shown in Fig. 6.

Referring to the drawing, in which like characters represent like parts, the lubricant containing receptacle may be formed in various well known ways. In my preferred embodiment, however, the receptacle consists of a short cylindrical barrel 10, one end of which is open and threaded exteriorly to receive the short closure cap 11, and the other end of which terminates in a restricted lubricant exit 12, to which a rigid cylindrical lubricant outlet nozzle 13 is rigidly secured by welding or other suitable means. The receptacle may be filled with lubricant when the cap 11 is unscrewed and removed from the open end of the barrel in the usual manner.

The rigid nozzle extends centrally and longitudinally from the outlet end of the barrel, and is provided with a central passage 14 extending therethrough which is in comunication with the lubricant exit 12, of the barrel. The inner end of the passage is restricted by a circular shoulder 15, the inner wall of which curves inwardly, and upwardly, forming a smooth junction with the curved inner wall of the lubricant exit 12, and providing a knife edge valve seat 16. The continuous curve thus formed within the receptacle, between the barrel and the valve seat, eliminates any corners or edges upon which lubricant can accumulate and permits the compressed lubricant to flush the valve seat of dirt and grit, insuring a leakproof closure. A valve member extends through the valve seat within the passage in the nozzle, and consists preferably, of a cylindrical and tapered head 17, which terminates in a stem 18. The stem is enlarged at its lower end and is threaded exteriorly. A longitudinally extending slot 19 is formed in the valve stem and its threaded end, and curves inwardly from the wall of the stem and substantially centrally through the threaded end thereof. The tapered portion of the head of the valve member extends into and forms a closure for the restricted portion of the passage in the nozzle, when it is seated against the circular knife edge of the valve seat.

A lubricant dispensing connector 21 having a passage extending axially therethrough is mounted to be reciprocated within the outer cylindrical end of the nozzle, and forms the contacting portion of the nozzle which engages with the nipple 20 which is attached to a bearing 22 in any suitable manner. The outer end of the connector projecting from the nozzle portion is of reduced diameter providing a contact face having a peripheral, circular, dirt cutting edge 23 and a centrally located, outlet passage 24. The end of the connector which slides within the hollow nozzle element 13 is threaded internally and receives the threaded head of the valve stem 18 forming an integral unit therewith.

A lubricant proof leather washer 26 provided with a central aperture, through which the valve stem extends, is seated upon the inner end of the connector. A steel washer 27, provided with a central aperture through which the valve stem extends, rests upon the washer 26. A coil spring 28 is positioned between the shoulder 15 and the washer 27, within the passage in the nozzle to retain the lubricant proof washer in contact with the connector, and also, normally to keep the valve member seated upon the valve seat. When the valve is open the lubricant passes from the barrel, through the valve seat, and into the passage in the nozzle in which the spring lies. The washer 26 is formed of a compressible material so that the lubricant under pressure passing through the central aperture therein will expand the washer and provide a tight fit thereof against the wall of the nozzle passage, to prevent lubricant from working down between the outer wall of the connector and the nozzle. When the valve is open, the lubricant under pressure fills the passage in which the spring lies, and passes into the space between the washers and the valve member, and then, into the slot 19 which overlies the passage 14 through the connector.

The cap 11 is provided with an internally apertured threaded bearing nipple 29, which receives the threaded piston rod 30. The outer end 31, of the piston rod is bent at an obtuse angle, and knurled longitudinally to provide a handle for the pistol, and an apertured grip is driven thereon. This angular handle provides a grip which can be firmly grasped in one hand, and further, will allow the user to exert a maximum direct pressure against the pistol while so held.

The inner end of the piston rod terminates in a cylindrical shank upon which the apertured leak proof piston 34 is reciprocably secured. A washer 35 extends below the piston upon the shank 33, and a washer 36 extends above the piston upon the shank 33. At the upper end of the shank is rigidly secured a stop 37, which with the upset end 38 of the piston rod, secures the piston upon the shank, and allows a limited sliding movement thereof.

Suitable resilient means are provided between the stop 37 on the piston rod and the reciprocable piston but in my preferred embodiment, I use a stiff concavo-convex, resilient sheet metal washer 39, which is apertured centrally to fit upon the shank. It will be understood that, while I have illustrated only one such washer, several superposed washers of this type could be used for the same purpose. Normally, the resilient washer retains the piston at the outer end of the shank, but the concavo-convex metal washer will flatten out as the piston slides up upon the shank, during each inward manual operation of the piston rod, when the outlet valve is closed. When the valve is opened the compressed spring will resume its normal position and move the piston to the end of the piston rod.

In pressure operated guns lubricant is forced from a container under high pressure, and it is the present practice mechanically to secure the outlet of the gun to the nipple to prevent leakage, when placed in operative contact. It is also the practice to provide a gasket made of leather, or similar material, between the contacting portions of the gun and the nipple to prevent lubricant from leaking from the connection.

In the several embodiments of my invention in contradistinction, to the above practices I provide, generally, a nipple having a metal inlet contact face, and a metal connector forming a part of the gun nozzle, having an outlet contact face which is pressed against the nipple face forming a leakproof connection.

The nipple 20 is provided with an inlet face 40 the outer contact surface of which is formed concavely spherical. A passage 42 extends through the wall of the inlet face and preferably centrally of the concave spherical contact surface.

The passage 24 extending through the circular contact face of the nozzle connector is of a diameter such that the peripheral circular contact edge 23 of the connector will fit within a portion of the spherical contact face of the nipple, engaging the same to provide a leakproof connection and enclosing the passage 42 of the nipple and the passage 24 of the nozzle face therebetween. The circular edge of the connector and the spherical surface of the nipple will allow leakproof connection to be made therebetween when the nozzle is held at various angles to the nipple, one angular position being shown in Fig. 2, and will, swiveling thereagainst, permit the position of the gun to be changed with respect to the nipple after contact is made. The gun can be held in operative leakproof connection with the nipple in any relation thereto in which the passages 42 and 24 remain enclosed by the contact of the two faces.

Pressure of the gun against the nipple when the contact faces are in engagement will move the connector 21 inwardly unseating the valve 17, and the prepressure created against the lubricant by the spring pressed piston will automatically force the lubricant through the nozzle as previously described and into the nipple, from which it passes to the element to be lubricated. The lubricant can also be ejected from the connector when the contact faces are in engagement and the valve opened, by screwing the piston inwardly. It will be seen, however, that it is generally more desirable to compress the spring 34 previously to the application of the gun to the nipple, so that a leakproof contact is made and a charge of lubricant will be ejected from the nozzle when the gun is pressed toward the nipple after placing the contact faces in desired operative position.

The nipple shown in Figs. 4 and 5 is preferably formed of a single piece of sheet metal, while the nipples shown in Figs. 1, 2, 6 and 7 are cast. The concave spherical face of the nipple shown in Figs. 4 and 5 is formed at an angle to the longitudinal axis of the nipple and is designed for use especially in places which are hard to reach while exerting pressure on the gun. This angular contact face, together with the construction of the two faces which permits a plurality of operative leakproof relations of the gun with the nipple, is decidedly advantageous in lubricating elements located in inaccessible places. The nipples shown in Figs. 1, 2 and 6 are each provided with a spring pressed valve 45 which normally close the inlet passages 42, the pressure of the lubricant from the gun opening the valves when it is forced thereagainst from the gun.

This case is a division as to the subject matter claimed herein, of an earlier application, Serial Number 602,465, filed November 21, 1922.

Having thus described my invention in a number of embodiments, I am aware that numerous and extensive departures may be made from the embodiments herein illustrated, described and referred to, but without departing from the spirit of my invention.

I claim:

1. The combination with a lubricant receiving nipple having a part forming an annular protective ridge and a recess providing a spherical concave contact face protected by said ridge, of a lubricant compressor for supplying lubricant under pressure to said nipple, said compressor having a nozzle element terminating in a flat end surrounded by a circular dirt cutting contact edge for co-operating with the contact face of the nipple to make sealed contact therewith from any one of a plurality of different angular positions.

2. The combination with a lubricant receiving nipple having a substantially circular, protecting and guiding ridge and a recess providing a spherical concave contact face protected by said ridge, of a lubricant compressor for supplying lubricant under pressure to said nipple, said compressor having a nozzle terminating in an end surrounded by a circular contact edge adapted to be guided by said ridge into contact with the nipple face for forming a sealed lubricant conducting connection between said nipple and said compressor.

3. In lubricating apparatus, the combination of a lubricant receiving nipple and a lubricant compressor for supplying lubricant thereto; said nipple having a passage therethrough, an end terminating in an annular ridge, and a recess located centrally of said ridge and leading to said passage, said recess having a concave contact face protected by said ridge; said compressor having a nozzle provided with a passage therethrough and having a reduced circular contact face providing a circular edge for engaging within and swiveling against said nipple face when manually pressed thereagainst, thereby forming a sealed lubricant conducting connection between said compressor and said nipple.

4. In lubricating apparatus of the class described, the combination of a lubricant receiving nipple and a lubricant compressor for supplying lubricant thereto at high pressure; said nipple having a passage therethrough, an end adapted to be secured to a part to be lubricated, a second end terminating in a substantially circular protective ridge, and a recess located centrally of said ridge and leading to said passage, said recess having a tapered, substantially non-compressible contact face protected by said ridge; said compressor having a nozzle provided with a lubricant passage therethrough and having a substantially non-compressible contact face for engaging within and swiveling against said nipple face when manually pressed thereagainst, thereby forming a sealed lubricant conducting connection between said compressor and said nipple.

In testimony whereof I hereunto affix my signature this 29th day of December, 1923.

OSCAR ULYSSES ZERK.